United States Patent
Reed et al.

(10) Patent No.: US 12,380,033 B2
(45) Date of Patent: Aug. 5, 2025

(54) REFRESHING CACHE REGIONS USING A MEMORY CONTROLLER AND MULTIPLE TABLES

(71) Applicant: CENTAUR TECHNOLOGY, INC., Austin, TX (US)

(72) Inventors: Douglas Raye Reed, Austin, TX (US); Al Loper, Austin, TX (US); Terry Parks, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 8 days.

(21) Appl. No.: 17/581,110

(22) Filed: Jan. 21, 2022

(65) Prior Publication Data
US 2023/0236985 A1    Jul. 27, 2023

(51) Int. Cl.
*G06F 12/00*        (2006.01)
*G06F 12/0891*      (2016.01)

(52) U.S. Cl.
CPC .... *G06F 12/0891* (2013.01); *G06F 2212/305* (2013.01)

(58) Field of Classification Search
CPC ........... G06F 12/0891; G06F 2212/305; G06F 12/0864; G06F 2212/1024; G06F 2212/1028; G06F 2212/1044; G06F 2212/401; G06F 12/0846; G06F 12/0895; G06F 12/084; G06F 12/0811
See application file for complete search history.

(56) References Cited

U.S. PATENT DOCUMENTS

| | | | | |
|---|---|---|---|---|
| 6,009,504 A * | 12/1999 | Krick | .................. | G06F 12/0893 711/108 |
| 9,972,375 B2 | 5/2018 | Parks et al. | | |
| 2006/0179206 A1* | 8/2006 | Brittain | .................... | G11C 5/04 711/105 |
| 2012/0290793 A1* | 11/2012 | Chung | ................ | G06F 12/0895 711/119 |
| 2012/0317367 A1* | 12/2012 | Grayson | ............. | G06F 12/0804 711/143 |
| 2014/0019691 A1* | 1/2014 | Dally | .................. | G06F 12/0895 711/144 |
| 2015/0106567 A1* | 4/2015 | Godard | ............... | G06F 12/0864 711/121 |

(Continued)

OTHER PUBLICATIONS

H. Cho, J. Kong, A. Munir and N. K. Giri, "CT-Cache: Compressed Tag-Driven Cache Architecture," 2018 IEEE Computer Society Annual Symposium on VLSI (ISVLSI), Hong Kong, China, 2018, pp. 94-99, doi: 10.1109/ISVLSI.2018.00027. (Year: 2018).*

*Primary Examiner* — Arvind Talukdar
(74) *Attorney, Agent, or Firm* — McClure, Qualey & Rodack, LLP (57) ABSTRACT

In one embodiment, a controller in a microprocessor, the controller configured to manage accesses to dynamic random access memory (DRAM), the controller comprising: a first table configured to track cache lines that have been written to zero for a plurality of first memory regions; and a second table configured to track the cache lines that have been written to zero for a plurality of second memory regions, wherein each of the plurality of second memory regions comprises a group of the plurality of first memory regions where all of the cache lines within each of the plurality of first memory regions within the group have been written to zero.

12 Claims, 4 Drawing Sheets

(56) References Cited

U.S. PATENT DOCUMENTS

2016/0357677 A1\* 12/2016 Hooker ................ G06F 9/3455
2017/0301386 A1\* 10/2017 Parks .................... G06F 3/0673
2019/0179770 A1\* 6/2019 Walker ................ G06F 12/0804
2020/0301840 A1 9/2020 Reed et al.

\* cited by examiner

| TABLE1 202 | |
|---|---|
| TAG0 302 | BITMASK 304 |
| TAG1 302 | BITMASK 304 |
| TAG2 302 | BITMASK 304 |
| ... | ... |
| TAGN 302 | BITMASK 304 |

| TABLE2 204 | |
|---|---|
| TAG0 308 | BITMASK 310 |
| TAG1 308 | BITMASK 310 |
| TAG2 308 | BITMASK 310 |
| ... | ... |
| TAGM 308 | BITMASK 310 |

306 →

FIG. 4 though the cache hierarchy is useful in reducing the data latency associated with accesses to memory, other measures are needed to reduce memory accesses.
REFRESHING CACHE REGIONS USING A MEMORY CONTROLLER AND MULTIPLE TABLES

TECHNICAL FIELD

The present invention relates in general to memory management, and in particular, managing accesses between a microprocessor and system memory.

BACKGROUND

Most modern computer systems include a microprocessor that performs the computations necessary to execute software programs. Computer systems also include other devices connected to (or internal to) the microprocessor, such as memory. The memory stores the software program instructions to be executed by the microprocessor. The memory also stores data that the program instructions manipulate to achieve the desired function of the program.

The devices in the computer system that are external to the microprocessor (or external to a processor core), such as the memory, are directly or indirectly connected to the microprocessor (or core) by a processor bus. The processor bus comprises a collection of signals that enable the microprocessor to transfer data in relatively large chunks. When the microprocessor executes program instructions that perform computations on the data stored in the memory, the microprocessor fetches the data from memory into the microprocessor using the processor bus. Similarly, the microprocessor writes results of the computations back to the memory using the processor bus.

The time required to fetch data from memory or to write data to memory is many times greater than the time required by the microprocessor to perform the computation on the data. Consequently, the microprocessor inefficiently waits idle for the data to be fetched from memory. To reduce this problem, modern microprocessors include at least one cache memory. The cache memory, or cache, is a memory internal to the microprocessor (or processor core)—typically much smaller than the system memory—that stores a subset of the data in the system memory. When the microprocessor executes an instruction that references data, the microprocessor checks to see if the data is present in the cache and is valid. If so, the instruction can be executed more quickly than if the data had to be retrieved from system memory since the data is already present in the cache. That is, the microprocessor does not have to wait while the data is fetched from the memory into the cache using the processor bus. The condition where the microprocessor detects that the data is present in the cache and valid is commonly referred to as a cache hit. The condition where the referenced data is not present in the cache is commonly referred to as a cache miss. When the referenced data is already in the cache memory, significant time savings are realized, by avoiding the extra clock cycles required to retrieve data from external memory.

In some microprocessors, the cache is actually made up of multiple caches. The multiple caches are arranged in a hierarchy of multiple levels. For example, a microprocessor may have two caches, referred to as a first-level (L1) cache and a second-level (L2) cache. The L1 cache is closer to the computation elements of the microprocessor than the L2 cache. That is, the L1 cache is capable of providing data to the computation elements faster than the L2 cache. The L2 cache is commonly larger and has more storage resources than the L1 cache. Some microprocessors may have a third cache (L3), which may be larger than the L2 cache. The L3 cache is sometimes referred to as a last level cache (LLC), and is a shared cache that is fully accessible and utilized by all cores of a microprocessor. Though the cache hierarchy is useful in reducing the data latency associated with accesses to memory, other measures are needed to reduce memory accesses.

One technique for reducing memory accesses has to do with the zero-valued data. Not all data occurs with uniform regularity, and in fact, zeroes are common. For instance, operating systems zero out entire pages upon a first allocation for applications. Having writes of zero are relatively common compared to non-zero writes. However, it is costly to send a write request or a read request to system memory (hereinafter, also referred to as dynamic random access memory or DRAM), particularly since physical reads or writes to DRAM cost power. To circumvent or mitigate such writes or reads of zero valued data enables a reduction in DRAM access bandwidth, power consumption, and a reduction in a latency cost of reading from DRAM. Further, once data is stored in DRAM, the current value at any given storage cell needs to be periodically refreshed (e.g., since DRAM cells comprise a transistor and a capacitor, where the capacitor leaks charge). For zero-valued cells, a refresh optimization may be implemented to selectively refresh portions of DRAM that are zero valued, which also saves power. In short, physical reads or writes to DRAM cost power.

Zero-valued based measures that reduce DRAM access, among other benefits, are described in U.S. Pat. No. 9,972,375, entitled, "Sanitize-Aware DRAM Controller", incorporated herein by reference. A controller is described for controlling DRAM, which comprises a plurality of blocks. A block is one or more units of storage in the DRAM for which the DRAM controller can selectively enable or disable refreshing. The DRAM controller includes flags each for association with a block of the blocks of the DRAM. A sanitize controller determines a block is to be sanitized (e.g., writing with zeroes) and in response sets a flag associated with the block and disables refreshing the block. In response to subsequently receiving a request to read data from a location in the block, if the flag is clear, the DRAM controller reads the location and returns data read from it. If the flag is set, the DRAM controller refrains from reading the DRAM and returns a value of zero. In effect, when a process (e.g., program, etc.) calls for writing a zero to some region (e.g., 64-byte chunk of memory) of DRAM that is zero valued, if the sanitize bits are set, there is no need to physically write to that region of DRAM. Further, any subsequent load access to attempt to read the contents of DRAM can be handled by simply returning zero when the table of sanitize bits are consulted and there is a hit for this particular memory region, thus avoiding the need to access the DRAM. Thus, through the use of this table of sanitize bits, updates to DRAM may be avoided.

SUMMARY

In one embodiment, a controller in a microprocessor, the controller configured to manage accesses to dynamic random access memory (DRAM), the controller comprising: a first table configured to track cache lines that have been written to zero for a plurality of first memory regions; and a second table configured to track the cache lines that have been written to zero for a plurality of second memory regions, wherein each of the plurality of second memory regions comprises a group of the plurality of first memory regions where all of the cache lines within each of the plurality of the first memory regions within the group have been written to zero.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

Certain embodiments of a cache line zero tracking method of a multi-core microprocessor, and associated systems and devices, are disclosed that augment the functionality of systems that use the knowledge of zero values to mitigate system memory accesses by using a cache line zero tracking controller (hereinafter, referred to also as simply a controller) in conjunction with plural tables (e.g., first and second tables), where the first table is used to track zero valued cache lines for a given memory region or memory page, and the second table is populated with information for each of the tracked memory pages (where all cache lines per page are zero valued) to enable tracking per row of a group or multiple pages that are zero valued.

Digressing briefly, since zeroing out cache lines may occur over plural blocks, for instance several megabytes at a time, the cost of storing information or state for many cache lines that make up a multiple or a group of pages (e.g., 12 megabytes of information or metadata) in a single look up table may offset benefits associated with mitigating accesses to system memory (e.g., dynamic random access or DRAM). In contrast, certain embodiments of a cache line zero tracking method make use of plural tables of varying granularity that facilitate the efficient storage and access of information while mitigating DRAM accesses.

Having summarized certain features of a cache line zero tracking method of the present invention, reference will now be made in detail to the description of a cache line zero tracking method as illustrated in the drawings. While a cache line zero tracking method will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" (and similarly with "comprise", "comprising", and "comprises") mean including (comprising), but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons of ordinary skill in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit (e.g., VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

Figure 1:
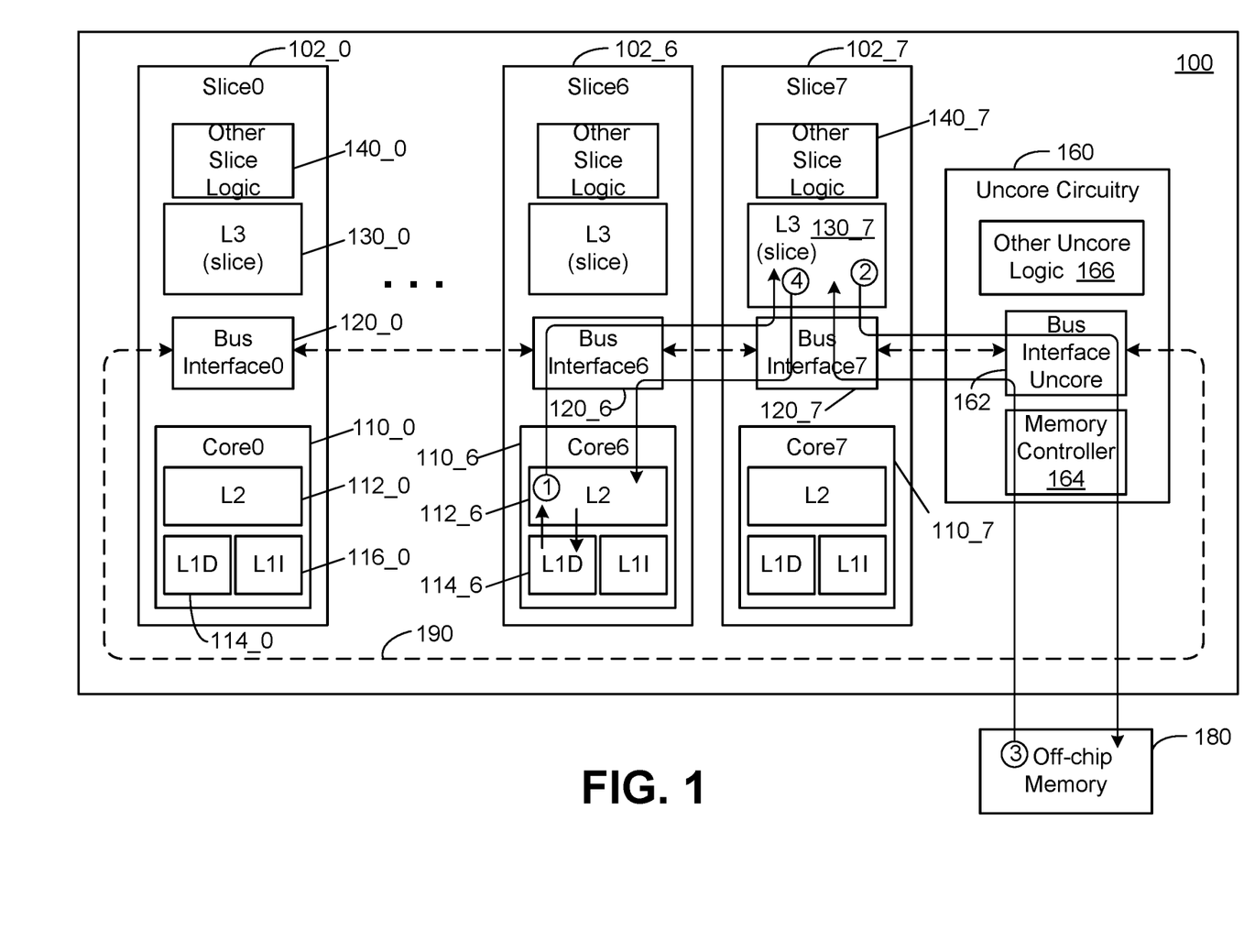
FIG. 1 is a block diagram that illustrates an example microprocessor in which an embodiment of a cache line zero tracking method is implemented.

FIG. 1 is a block diagram showing an example multi-core microprocessor 100 in which an embodiment of a cache line zero tracking method is implemented. As will be described herein, the present invention is directed to an improved mechanism for tracking cache line zeroes through the use of plural tables of varying granularity, which mitigates DRAM accesses and reduces the cost when compared to a single table when tracking a group of memory pages. As will be appreciated by persons having ordinary skill in the art from the description provided herein, the present invention may be implemented in a variety of circuit configurations and architectures, and the architecture illustrated in FIG. 1 is merely one of many suitable architectures. Specifically, in the embodiment illustrated in FIG. 1, the microprocessor 100 is an eight-core processor, wherein the cores are enumerated core0 110_0 through core7 110_7. In the illustrated embodiment, numerous circuit components and details are omitted, which are not germane to an understanding of the present invention. As will be appreciated by persons having ordinary skill in the art, each processing core (110_0 through 110_7) includes certain associated or companion circuitry that is replicated throughout the microprocessor 100. Each such related sub-circuit is denoted in the illustrated embodiment as a slice. With eight processing cores 110_0 through 110_7, there are correspondingly eight slices 102_0 through 102_7. Other circuitry that is not described herein is merely denoted as "other slice logic" 140_0 through 140_7.

In the illustrated embodiment, a three-level cache system is employed, which includes a level-one (L1) cache, a level-two (L2) cache, and a level-three (L3) cache (also referred to as a last-level cache (LLC)). The L1 cache is separated into both a data cache and an instruction cache, respectively denoted as L1D and L1I. The L2 cache also resides on core, meaning that both the L1 cache and the L2 cache are in the same circuitry as the core of each slice. That is, each core of each slice has its own dedicated L1D, L1I, and L2 caches. Outside of the core, but within each slice is an L3 cache. In one embodiment, the L3 cache 130_0 through 130_7 (also collectively referred to herein as 130) is a distributed cache, meaning that, in this example eight-core architecture, ⅛th of the L3 cache resides in slice0 102_0, ⅛th of the L3 cache resides in slice1 102_1, etc. In one embodiment, each L1 cache is 32 k in size, each L2 cache is 256 k in size, and each slice of the L3 cache is 2 megabytes in size. Thus, the total size of the L3 cache is 16 megabytes. Note that other individual or aggregate cache sizes may be used in some embodiments.

Bus interface logic 120_0 through 120_7 is provided in each slice in order to manage communications from the various circuit components among the different slices. As illustrated in FIG. 1, a communication bus 190 (also referred to a cache coherent interconnect, which may be implemented as a ring or mesh) is utilized to allow communications among the various circuit slices, as well as with uncore circuitry 160. The uncore circuitry 160 merely denotes additional circuitry that is on the processor chip, but is not part of the core circuitry associated with each slice. As with each illustrated slice, the un-core circuitry 160 includes a bus interface circuit 162, which provides an interface, for each core and/or L3 cache slice and other components, to the interconnect 190. Also illustrated is a memory controller 164, also referred to herein as a DRAM controller, for interfacing with off-processor (off-chip) memory 180 (e.g., DRAM). Finally, other un-core logic 166 is broadly denoted by a block, which represents other circuitry that may be included as a part of the un-core processor circuitry (and again, which need not be described for an understanding of the invention).

To better illustrate certain inter and intra communications of some of the circuit components, the following example will be presented. This example illustrates communications associated with a hypothetical load miss in the core6 cache. That is, this hypothetical assumes that the processing core6 110_6 is executing code that requests a load for data at hypothetical address 1000. When such a load request is encountered, the system first performs a lookup in L1D 114_6 to see if that data exists in the L1D cache. Assuming that the data is not in the L1D cache, then a lookup is performed in the L2 cache 112_6. Again, assuming that the data is not in the L2 cache, then a lookup is performed to see if the data exists in the L3 cache. As mentioned above, the L3 cache is a distributed cache, so the system first needs to determine which slice of the L3 cache the data should reside in, if in fact it resides in the L3 cache. As is known, this process can be performed using a hashing function, which is merely the exclusive ORing of bits, to get a three-bit address (sufficient to identify which slice—slice 0 through slice 7—the data is stored in).

In keeping with the example, assume this hashing function results in an indication that the data, if present in the L3 cache, would be present in that portion of the L3 cache residing in slice7. A communication is then made from the L2 cache of slice6 102_6 through bus interfaces 120_6 and 120_7 to the L3 cache present in slice7 102_7. This communication is denoted in the figure by the encircled number 1. If the data was present in the L3 cache, then it would be communicated back from the L3 cache 130_7 to the L2 cache 112_6. However, and in this example, assume that the data is not in the L3 cache either, resulting in a cache miss. Consequently, a communication is made from the L3 cache 130_7 through bus interface7 120_7 through the un-core bus interface 162 to the off-chip memory 180, through the memory controller 164. This communication is denoted in the figure by the encircled number 2. A cache line that includes the data residing at address 1000 is then communicated, in one embodiment, from the off-chip memory 180 back through memory controller 164 and un-core bus interface 162 into the L3 cache 130_7. This communication is denoted in the figure by the encircled number 3. After that data is written into the L3 cache, it is then communicated to the requesting core, core6 110_6 through the bus interfaces 120_7 and 120_6. This communication is denoted in the figure by the encircled number 4. At this point, once the load request has been completed, in one embodiment, that data will reside in each of the caches L3, L2, and L1D. Note that the inclusion policy implied above for FIG. 1 is merely an illustration, and that in some embodiments, a non-inclusive policy, exclusive policy, or variations or a blend of policies may be used by the cache hierarchy, including a Non-inclusive Cache, Inclusive Directory (NCID) Architecture.

Figure 2:
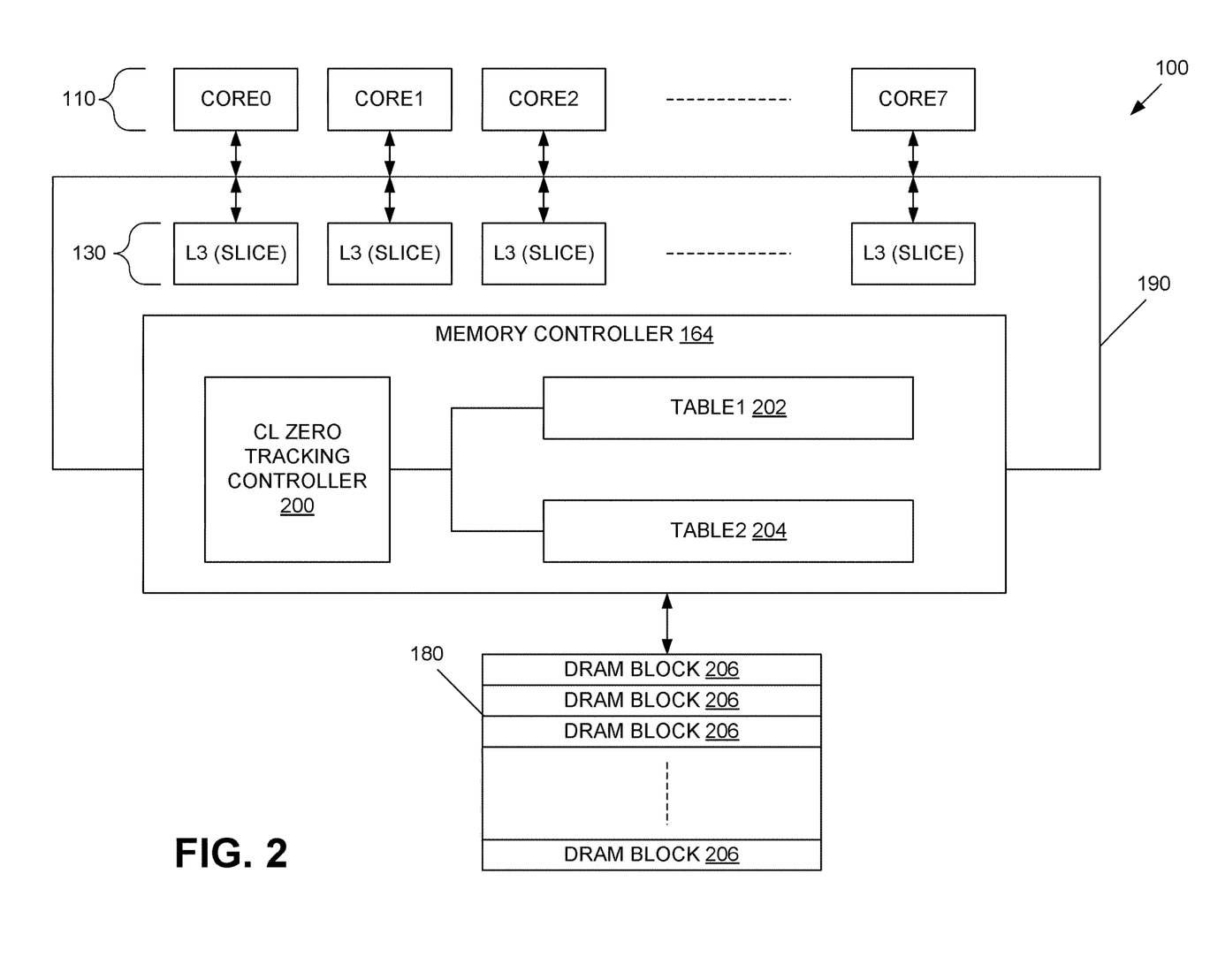
FIG. 2 is a schematic diagram that illustrates an embodiment of an example controller and cooperating tables used to implement an embodiment of a cache line zero tracking method.

Having generally described an example environment in which an embodiment of a cache line zero tracking method may be implemented, attention is directed to FIG. 2, which shows select features from the microprocessor 100 depicted in FIG. 1 as well as additional features. For instance, shown are the cores 110 and L3 cache (slices) 130, which are coupled to the interconnect 190 which is coupled to the memory controller 164. The cores 110 of the microprocessor 100 execute programs, including system software, such as an operating system and/or system firmware, such as Basic Input/Output System (BIOS) or extensible firmware, as well as utilities and application programs, as is known.

The memory controller 164, as described above, is coupled to DRAM 180, and controls accesses to DRAM 180. The memory controller 164 comprises a cache line zero tracking controller 200 (hereinafter, simply referred to as controller 200), which may be implemented as a state machine or microcontroller. The memory controller 164 further comprises plural (e.g., two) tables, including table1 202 and table2 204, which as explained below, are of different tracking granularity. The controller 200 in conjunction with the table1 202 and table2 204 are used to track zero cache lines in granularity of cache lines per memory region (or memory page) and a group of memory regions (plural memory pages), respectively, as described further below. In some embodiments, additional tables may be used. The DRAM 180 is arranged as a plurality of DRAM blocks 206. In one embodiment, the size of a DRAM block 206 corresponds to the size of a smallest page supported by the microprocessor 100 virtual memory system, though in some embodiments, other sized blocks may be used. The system software, among other things, sanitizes portions of the DRAM 180, including entire DRAM blocks 206. Operating systems may sanitize memory in the granularity of a page (e.g., 4 KB) whose size is determined according to the virtual memory system supported by the microprocessor 100. Further, operating systems may sanitize memory according to plural pages collectively comprising a group, which may be of sizes 2 MB, 16 MB, 1 GB, etc., as should be appreciated by one having ordinary skill. In the description that follows, the table1 202 is referred to as a 4 kilobyte (KB) table, and the table2 204 is referred to as a 2 megabyte (MB) table, the values of 4 KB and 2 MB corresponding to the cache lines of the memory regions that each entry of the respective table tracks. Note that 4 KB and 2 MB are example values used for illustration, and that in some embodiments, other values may be used for these respective tables.

Figure 3A:
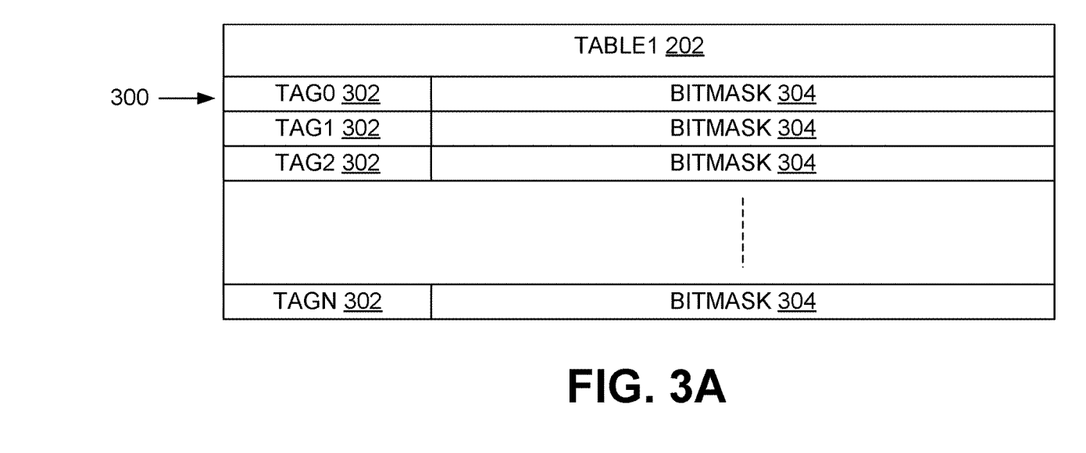
FIGS. 3A and 3B are schematic diagrams that illustrate an example first table used for tracking per page cache line zeroes and a second example table used for tracking cache line zeroes for a multiple or group of the tracked pages where all bits are set in the group, in accordance with an embodiment of the invention.
Figure 3B:
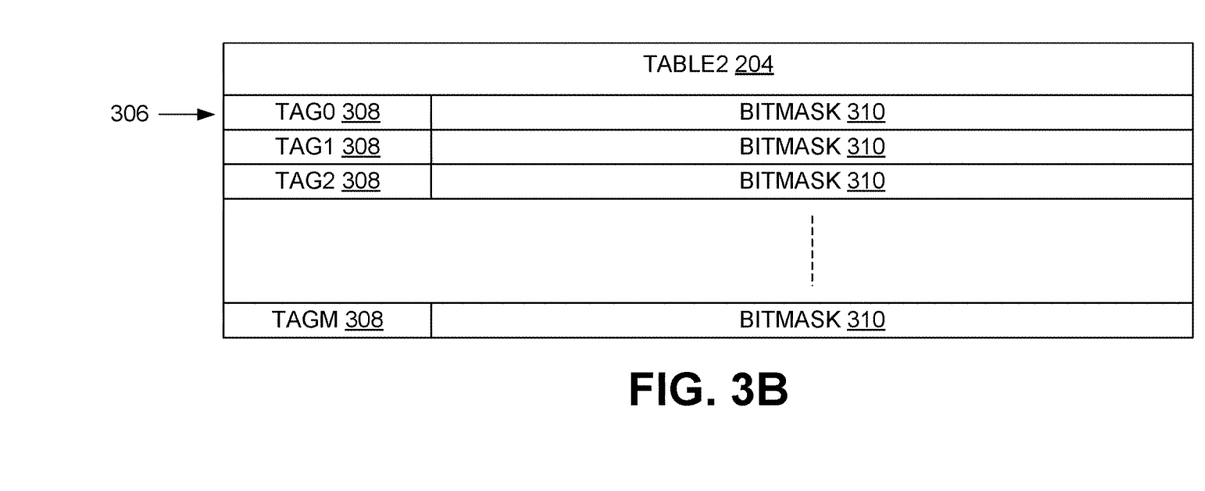

FIG. 3A is a schematic diagram that illustrates the 4 KB table1 202 used (in conjunction with the controller 200) for tracking per memory page cache line zeroes, and FIG. 3B is a schematic diagram that illustrates the 2 MB table2 204 used (in conjunction with the controller 200) for tracking the cache line zeroes for each group or multiple pages contained within a given tag or physical address in an entry in the 2 MB table2 204, where all tracked cache lines in each group is zero valued. The 4 KB table1 202 and 2 MB table2 204 may collectively be referred to as a zero cache. Digressing briefly, one approach to tracking cache line zeroes is simply to have a single cache line table with extensive granularity, though for practical purposes, such a table would be rather unwieldy. That is, such a single massive table would offset any meaningful performance or power benefits in reducing DRAM access. The larger the table, the more area and power it consumes, and thus it is not practical to have a gigantic table that tracks individual cache lines that are written to zero. Recognizing that a common use case is writing an entire 4 KB page to zero, a common operating system paradigm, the 4 KB table1 202 is organized into rows corresponding to 4 KB regions rather than rows corresponding to cache lines. However, one challenge is that such a table, alone, is still not large enough since operating systems do not use only 4 KB pages. For instance, operating systems may use 2 MB pages, gigabyte pages, etc. Thus, if the 4 KB table1 202 is the only table, and if an operating system zeroes out an entire 2 MB page, the 4 KB table needs to be very large (many rows or entries) with expensive comparators to store state for the plural pages, which again, is unwieldy from a practical standpoint, with rows growing in multiples of 512 pages. On the other hand, instead of using a 4 KB table, one approach may be to use a single 2 MB page table. However, such a table needs 512×64 bits to track cache lines, which also is unwieldy.

Accordingly, certain embodiments of a cache line zero tracking method make use of two tables, the 4 KB table1 202 and the 2 MB table2 204, which represents somewhat of a hybrid of the above described approaches. Referring to FIG. 3A, the 4 KB table1 202 comprises plural entries or rows 300, each entry comprising a tag 302 and a bitmask 304. The 4 KB table1 202 is indexed with physical address bits beginning with physical address bit 12 (the 4 KB boundary). Rows or entries 300 are tagged (tag 302) with the remaining upper physical address bits required to specify the full 4 KB page. Each of the rows of the 4 KB table1 202 also have the bitmask 304, which in one embodiment comprises a 64-bit map of cache lines which have been written to zero. The 4 KB table1 202 is populated by writes from the (coherent) interconnect 190 (FIG. 2), where data is observed to be entirely zero (0).

With respect to FIG. 3B, the 2 MB table2 204 is indexed with physical address bits beginning with physical address 21 (the 2 MB boundary). Rows or entries 306 of the 2 MB table2 204 are tagged (tag 308) with the remaining upper physical address bits required to specify a contiguous 2 MB region. Rows of the 2 MB table2 204 also have bitmask 310, the bitmask comprising a 512-bit map of 4 KB pages which have been fully written to zero. The 2 MB table2 204 is populated by writes from the (coherent) interconnect 190 (FIG. 2) where data is observed to be entirely zero (0), and when the write fully completes a 4 KB region (e.g., all bits of the corresponding 4 KB table row 300 are set).

Read requests from the interconnect 190 initiate a lookup into both the 4 KB table1 202 and the 2 MB table2 204. If there is a hit in either table 202, 204 (e.g., the page has a row and the corresponding bit is set), the memory controller 164 returns zero data immediately without performing a DRAM access. Further, when rows are evicted from either of the tables 202, 204, a state machine (e.g., the controller 200) iterates over the set bits and issues the corresponding zero-writes to DRAM 180.

Explaining the memory controller 164 further, the 4 KB table1 202 comprises a table of 4 KB regions, where each row or entry 300 is used to track into the cache lines with respect to zero, and then once an entire row 300 (e.g., the entire 4 KB region) is zeroed out, as indicated by the bitmask 304, that row is removed from the 4 KB table1 202 and its information is migrated (e.g., becomes a new row) into the 2 MB table2 204 with just one of the 512 bits set. As the operating system proceeds to zero out the next adjacent 4 KB page, or another 4 KB page in the same 2 MB region, then that row is removed from the 4 KB table1 202 and its information migrated to the 2 MB table 204 (e.g., the corresponding bit in the row of the 2 MB table2 204 that corresponds to that same 2 MB region is set). Note that, initially, the tables 202, 204 are empty. As each of the rows of the 4 KB table1 202 are removed (e.g., all bits are set in a row to remove the row), the row information is migrated as a new row (if not contained within an existing 2 MB region of the 2 MB table2 204 and instead is a new entry), or the information is migrated as an update (bit set) to a corresponding bit in the 512-bit map (bitmask 310) when the location is contained within an existing 2 MB region.

Figure 4:
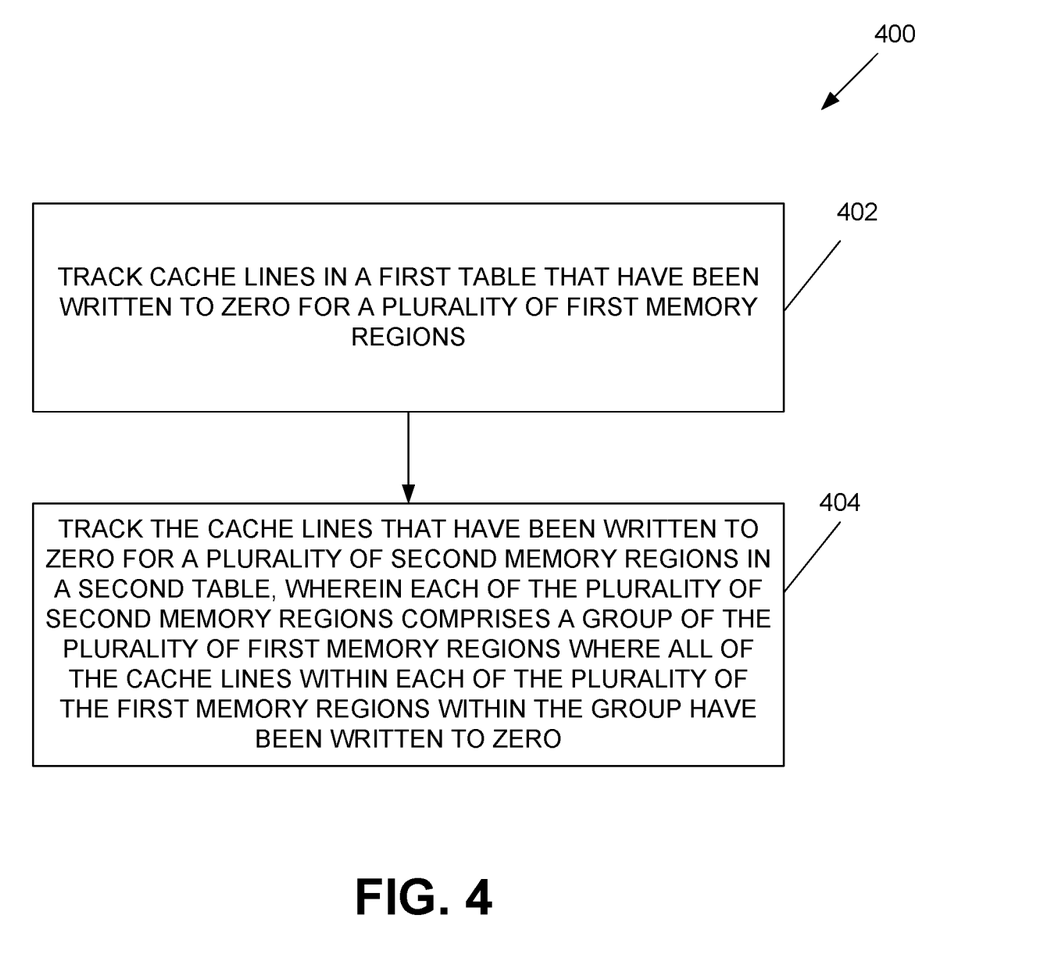
FIG. 4 is a flow diagram that illustrates an embodiment of an example cache line zero tracking method.

In view of the above description, it should be appreciated by one having ordinary skill in the art that one embodiment of a method performed by a controller in a microprocessor, the controller configured to manage accesses to dynamic random access memory (DRAM), the method denoted in FIG. 4 as method 400, comprising: tracking cache lines in a first table that have been written to zero for a plurality of first memory regions (402); and tracking the cache lines that have been written to zero for a plurality of second memory regions in a second table, wherein each of the plurality of second memory regions comprises a group of the plurality of first memory regions where all of the cache lines within each of the plurality of the first memory regions within the group have been written to zero (404). The tables are used in conjunction with the controller to perform tracking, as well as performing migration and bit settings.

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, or one or more of the blocks may be omitted, depending on the functionality involved, as would be understood by those reasonably skilled in the art of the present disclosure. For instance, the method 400 in FIG. 4 may be performed by the microprocessor generally, and in particular, by the cache line zero tracking controller, or in some embodiments, by the memory controller comprising functionality of the cache line zero tracking controller, where the cache line zero tracking controller may comprise a state machine and/or microcontroller. In some embodiments, the cache line zero tracking controller and tables 202, 204 may be coupled between the interconnect and the memory controller 164.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

The invention claimed is:

1. A controller in a microprocessor, the controller configured to manage accesses to dynamic random access memory (DRAM), the controller comprising:
    a first table comprising first plural bitmasks, each of the first plural bitmasks corresponding to a respective memory page of cache lines, the respective memory page corresponding to a respective region in the DRAM, the controller configured to set a bit for one of the first plural bitmasks for each cache line of the memory page written to zero; and
    a second table configured for storing second plural bitmasks, wherein the controller is configured to enter one of the second plural bitmasks as an entry into the second table and set a bit for the one of the second plural bitmasks when all bits of the one of the first plural bitmasks are set based on all of the cache lines of the memory page corresponding to the one of the first plural bitmasks being written to zero, wherein the first table is separate from the second table.

2. The controller of claim 1, wherein the first table comprises plural entries corresponding to the plural memory pages, wherein each entry comprises a tag corresponding to an address of one of the plural memory pages and a bitmask corresponding to each of the cache lines within the one of the plural memory pages.

3. The controller of claim 2, wherein the tag comprises upper physical address bits that specify a full memory page, and wherein the bitmask is based on a size of each memory page and a size of each of the cache lines.

4. The controller of claim 2, wherein based on all bits of the bitmask corresponding to each of the cache lines within the one of the plural memory pages being set, information of the corresponding entry is migrated into the second table.

5. The controller of claim 1, wherein the second table comprises plural entries corresponding to the second plural bitmasks, each of the second plural bitmasks corresponding to plural memory pages corresponding to a plurality of the first plural bitmasks of the first table having all bits set by the controller based on all cache lines of the memory pages corresponding to the plurality of first plural bitmasks being written to zero, wherein each entry further comprises a tag corresponding to an address of one of the plural memory pages and a bitmask.

6. The controller of claim 5, wherein the tag comprises upper physical address bits that specify a full and contiguous N megabyte (MB) region, where N is sufficient storage for more than one memory page.

7. A method performed by a controller, the controller configured to manage accesses to dynamic random access memory (DRAM), the method comprising:
    in a first table comprising first plural bitmasks, each of the first plural bitmasks corresponding to a respective memory page of cache lines, the respective memory page corresponding to a respective region in the DRAM, setting a bit for one of first plural bitmasks for each cache line of the memory page written to zero; and
    in a second table configured for storing second plural bitmasks, entering one of the second plural bitmasks as an entry into the second table and set a bit for the one of the second plural bitmasks when all bits of the one of the first plural bitmasks are set based on all of the cache lines of the memory page corresponding to the one of the first plural bitmasks being written to zero, wherein the first table is separate from the second table.

8. The method of claim 7, wherein the first table comprises plural entries corresponding to the plural memory pages, wherein each entry comprises a tag corresponding to an address of one of the plural memory pages and a bitmask corresponding to each of the cache lines within the one of the plural memory pages.

9. The method of claim 8, wherein the tag comprises upper physical address bits that specify a full memory page, and wherein the bitmask is based on a size of each memory page and a size of each of the cache lines.

10. The method of claim 8, wherein based on all bits of the bitmask corresponding to each of the cache lines within the one of the plural memory pages being set, migrating information of the corresponding entry into the second table.

11. The method of claim 7, wherein the second table comprises plural entries corresponding to the second plural bitmasks, each of the second plural bitmasks corresponding to plural memory pages corresponding to a plurality of the first plural bitmasks of the first table having all bits set based on all cache lines of the memory pages corresponding to the plurality of first plural bitmasks being written to zero, wherein each entry further comprises a tag corresponding to an address of one of the plural memory pages and a bitmask.

12. The method of claim 11, wherein the tag comprises upper physical address bits that specify a full and contiguous N megabyte (MB) region, where N is sufficient storage for more than one memory page.

* * * * *